US012636590B2

(12) United States Patent
Gates et al.

(10) Patent No.: US 12,636,590 B2
(45) Date of Patent: May 26, 2026

(54) PROCESS TO TREAT HEAVY OIL OR BITUMEN OR MIXTURES OF DILUTANTS AND HEAVY OIL OR BITUMEN

(71) Applicants: Ian Donald Gates, Calgary (CA); Jingyi Wang, Calgary (CA)

(72) Inventors: Ian Donald Gates, Calgary (CA); Jingyi Wang, Calgary (CA)

( * ) Notice: Subject to any disclaimer, the term of this patent is extended or adjusted under 35 U.S.C. 154(b) by 778 days.

(21) Appl. No.: 18/012,055

(22) PCT Filed: Jun. 29, 2021

(86) PCT No.: PCT/CA2021/050890
§ 371 (c)(1),
(2) Date: Dec. 21, 2022

(87) PCT Pub. No.: WO2022/000081
PCT Pub. Date: Jan. 6, 2022

(65) Prior Publication Data
US 2023/0311020 A1     Oct. 5, 2023

Related U.S. Application Data

(60) Provisional application No. 63/045,594, filed on Jun. 29, 2020.

(51) Int. Cl.
B01J 19/24     (2006.01)
B01D 3/00     (2006.01)
(Continued)

(52) U.S. Cl.
CPC ............... B01D 3/009 (2013.01); B01D 3/04 (2013.01); B01D 5/006 (2013.01); F17D 1/18 (2013.01);
(Continued)

(58) Field of Classification Search
CPC .......... B01D 3/009; B01D 3/04; B01D 5/006; F17D 1/18; C10G 1/045; C10G 7/04;
(Continued)

(56) References Cited

U.S. PATENT DOCUMENTS 1,465,599 A     8/1923   Christoph
3,489,649 A  *  1/1970   Gunther .................. C02F 1/045
                                                                422/531

(Continued)

OTHER PUBLICATIONS

Supplementary European Search Report mailed on Nov. 24, 2023, from corresponding international Application No. EP21833837. International Search Report mailed on Aug. 31, 2021, from corresponding International Application No. PCT/CA2021/050890.

*Primary Examiner* — Huy Tram Nguyen
(74) *Attorney, Agent, or Firm* — Davidson Kappel LLC

(57) ABSTRACT

A heavy oil or bitumen or mixtures of heavy oil and bitumen or mixtures of a dilutant and heavy oil or bitumen is treated to separate components of the feed oil and induce reactions that crack the heavy oil or bitumen into light components. A heated inclined dual tube unit arrangement where feed oil enters the arrangement through the inner tube and which opens partway up the outer tube. Vaporized oil continues to flow up within the outer tube whereas the liquid oil product flows down the annular space between the inner and outer tubes. The vaporized oil is condensed beyond the dual tube arrangement to yield liquid oil products. Heat exchange can be done between the products and the inlet feed oil to improve the energy efficiency of the unit.

14 Claims, 4 Drawing Sheets

(51) Int. Cl.
    *B01D 3/04*          (2006.01)
    *B01D 5/00*          (2006.01)
    *C10G 9/20*          (2006.01)
    *F17D 1/18*          (2006.01)
    *C10G 1/04*          (2006.01)
    *C10G 7/04*          (2006.01)
    *C10G 49/22*        (2006.01)

(52) U.S. Cl.
    CPC ............... *C10G 1/045* (2013.01); *C10G 7/04*
                (2013.01); *C10G 49/22* (2013.01)

(58) Field of Classification Search
    CPC .......... C10G 49/22; C10G 1/002; C10G 1/02;
                C10G 1/08; C10G 9/20; B01J
           2219/00132; B01J 2219/00157; B01J
             2219/0236; B01J 2219/029; B01J
             2219/0871; B01J 2219/187; B01J
         2219/2428; B01J 19/0013; B01J 19/244
    USPC ........................................................ 422/187
    See application file for complete search history.

(56)                References Cited

U.S. PATENT DOCUMENTS

| 3,844,898 A | 10/1974 | De Graff |
| 3,844,989 A | 10/1974 | Noriho et al. |
| 3,959,085 A | 5/1976 | De Graff |
| 4,094,769 A | 6/1978 | Brown |

\* cited by examiner

PROCESS TO TREAT HEAVY OIL OR BITUMEN OR MIXTURES OF DILUTANTS AND HEAVY OIL OR BITUMEN

This application is a U.S. national phase application under 35 U.S.C. of § 371 of International Application No. PCT/CA2021/050890, filed Jun. 29, 2021, which claims priority to U.S. Provisional Application No. 63/045,594, filed Jun. 29, 2020, the disclosures of which are all hereby incorporated by reference herein.

TECHNICAL FIELD

The technical field relates to treatment of heavy oil and/or bitumen of mixtures of dilutants (solvents) and heavy and/or bitumen into lighter oil components and distillate and heavy oil products that have enhanced value and enable easier transportation or processing.

BACKGROUND

Oil production is conducted globally and conversion of oil is done to transform it into transportation fuels and materials used in the petrochemicals or construction industries. Transport of oil is typically by truck, rail car, or pipeline all in liquid form.

Heavy oil and bitumen are viscous oils with viscosities typically greater than 100 cP, often greater than 1,000 cP, which are often transported through trucks or rail cars or pipeline or ship tankers. Heavy oil can have viscosities in the thousands to tens of thousands of cP and bitumen can have viscosities in the hundreds of thousands to millions of cP.

To meet pipeline specifications for flow, heavy oil and bitumen must be diluted with a dilutant or solvent to meet viscosity and density and other specifications for pipelining. This adds costs to the processing and transportation of heavy oil and bitumen. Typically, this mixture of heavy oil or bitumen and solvent is called dilbit. The dilutant or solvent mixed with the heavy oil or bitumen often consists of natural gas condensates.

For rail car transport, heavy oil and bitumen must be placed in heated tanks so that the oil can be heated to remove it from the rail car.

Heavy oil and bitumen is processed by upgrading into synthetic crude oil and consequent refining into transportation fuels and feedstocks for the petrochemical industry. This is done in massive upgraders where hydrocracking (hydrogen addition) or coking (carbon rejection) is conducted to yield a synthetic crude oil.

There is an ongoing need for raising the value of raw heavy oil and bitumen. Due to their elevated viscosity at natural conditions, heavy oil and bitumen typically have lower value than that of conventional, low viscosity oil. Often, heavy oil or bitumen are upgraded to yield synthetic crude oil which in turn can be refined to yield transportation fuels.

There is an ongoing need for safe transport of heavy oil and bitumen to upgraders, refineries, and petrochemical plants. Transportation of heavy oil and bitumen in liquid form, with or without a solvent diluent, has risk for all known forms of transport including truck, rail car, pipeline, or ship. This risk consists of health, safety and environmental risks that can harm humans, processing plants, animals, ecosystems (e.g. rivers, land). Thus, there is a need to have safer methods for transportation of heavy oil and bitumen.

The originality of the method described wherein lies in the conversion of heavy oil or bitumen or a mixture of heavy oil or bitumen with a dilutant to yield a valuable distillate oil product and a heavy oil cut product.

The distillate oil product has low viscosity, typically lower than 50 cP, that is readily pipelineable and can be used as a dilutant for mixing with heavy oil or bitumen for transportation or as an oil product as feedstock for refineries.

The heavy oil cut product can be transported in heated form as a feedstock for the viscous oil products including asphalt, tar, asphalt binder, asphalt additive, coker feed, or fuel.

The heavy oil cut product can be transported by conversion to pellets to be transported in semi-solid form.

SUMMARY

In general, the present specification describes a device to treat a heavy oil or bitumen or mixture of the two, collectively referred to as a source oil, or a mixture of a dilutant and source oil, referred to as a diluted oil.

The method taught here consists of a heated inclined dual tube unit arrangement where feed oil enters the arrangement through the inner tube and which opens partway up the outer tube. Vaporized oil continues to flow up within the outer tube whereas the liquid oil product flows down the annular space between the inner and outer tubes. The vaporized oil is condensed beyond the dual tube arrangement to yield liquid oil products. Heat exchange can be done between the products and the inlet feed oil to improve the energy efficiency of the unit.

The outside temperature of the outer tube is maintained at a specified temperature, depending on the characteristics of the feed oil, typically between 150 and 450° C.

If heavy oil or bitumen (source oil) is fed to the unit, the products from the unit consists of the light distillate oil product and a heavy oil cut product. The chemical changes that occur to the heavy oil or bitumen includes thermal cracking (pyrolysis).

If diluted oil (heavy oil or bitumen mixed with a dilutant) is fed to the unit, the products from the unit can be the dilutant and the heavy oil or bitumen. The chemical changes that occur to the diluted oil includes distillation.

If diluted oil (heavy oil or bitumen mixed with a dilutant) is fed to the unit, the products from the unit can be the dilutant, a light distillate oil product and a heavy oil cut product. The chemical changes that occur to the diluted oil includes distillation and thermal cracking (pyrolysis).

Materials can be added to the oil fed to the unit to help in transforming the oil to new products. Examples include hydrogen or hydrogen donors, methane, ethane, butane, and other alkanes or aromatic solvents.

Downstream of the dual tube unit, the heavy oil cut product can be formed into pellets for transportation.

Downstream of the dual tube unit, the light oil product consisting of dilutant and distillate oils can be separated by using distillation.

The present method can also be used with residual oil fractions from upgrading and refining plants or mixtures of solvents or dilutants and residual oil fractions.

Several of the units can be used in parallel to yield different oil products from a source oil.

In keeping with the foregoing, methods and devices are provided for treating heavy oil or bitumen or mixtures of heavy oil and bitumen or mixtures of a dilutant and heavy oil or bitumen comprising:

an inclined dual tube device where an inner tube is fitted within an outer tube and the inner tube is inserted from the bottom of the outer tube and the inner tube is shorter
than the length of the outer tube;
the dual tube arrangement is heated;
the heavy oil or bitumen or mixtures of heavy oil and
bitumen or mixtures of a dilutant and heavy oil or
bitumen is continuously flowed through the inner tube
from its base into the device;
oil products generated in the device are produced within
the dual tube device; and
the light end product generated flows from the top of the
outer tube and the heavy cut product generated flows
from the bottom of the outer tube.
The inner tube may for example have outer diameter is
between 10 and 90% of the inside diameter of the outer tube;
the preferred inner tube outer diameter is between 40 and
60% of the inside diameter of the outer tube.
The inner tube may be inserted into the outer tube with its
exit within the outer tube between 20 and 80% of the length
of the outer tube; the preferred length of the inner tube
within the outer tube is between 50 and 65% of the length
of the outer tube.
The dual pipe device may for example be inclined
between 20 and 90 with respect to the horizontal; the
preferred inclination is between 40 and 60 with respect to the
horizontal.
The temperature of the dual tube device may for example
be maintained at a defined temperature where separation by
evaporation of feed oil components is achieved into separate
light and heavy cuts; the preferred temperature is between
150 and 500 C and more specifically preferred to between
230 and 480 C.
The dual tube device may for example be operated at
temperatures to achieve thermal cracking reactions within
the dual tube device; the preferred temperature is between
250 and 500 C and more specifically preferred to between
300 and 480 C.
The location of the exit ports at the top and bottom in the
outer tube may for example be located at positions with
length equal or smaller than five outer tube diameters from
the ends of the outer tube; the preferred locations are at
positions with length equal or smaller than two outer tube
diameters from the ends of the outer tube.
The light oil product from the top of the dual tube device
may be fed to another dual tube device to achieve further
separation of the light oil product into a lighter oil product
and a heavy cut product.
The heavy cut oil product from the bottom of the dual tube
device may be fed to another dual tube device to achieve
further separation of heavy cut oil product into a light oil
product and a heavier cut product.
The products of multiple dual tube devices may be used
to become the feed oil for other multiple dual tube devices
to achieve multiple light oil and heavy cut oil products, each
from different devices.
A condenser may be used to condense the light oil
products to a liquid.
The output streams from arrays of dual tube devices may
be used as the feed streams for one or more other dual tube
devices for the production of light and heavy cut oil prod-
ucts.
An oil and water mixture may be fed to the dual tube
device for the separation of oil and water.
A hydrogen source may be added to the feed oil to
enhance the yield of upgraded oil products; the preferred
source of hydrogen is hydrogen gas.

A catalyst may be placed within the inner tube or the
annular space between the inner and outer tubes to enhance
the yield of upgraded oil products.
The details of one or more implementations are set forth
in the description below. Other features and advantages will
be apparent from the specification and the claims. The
contents of the patent and non-patent documents cited herein
are hereby incorporated by reference in their entireties.

BRIEF DESCRIPTION OF THE DRAWING

Features and advantages of embodiments of the present
application will become apparent from the following
detailed description and the appended drawing, in which.

DETAILED DESCRIPTION

The present description relates to a method and device for
treating heavy oil or bitumen into more valuable products
including a light distillate oil product and a heavy oil cut
product.
The method and device described here can be used to treat
heavy oil or bitumen or mixtures of the two, or mixtures of
dilutant and heavy oil or bitumen.
The treatment of the heavy oil or bitumen or mixtures of
dilutant and heavy oil or bitumen, collectively referred to as
the feed oil, includes heating the feed oil to a specified
temperature. The heating leads to phase separation of light
oil components from the feed oil as well as thermal cracking
(pyrolysis) which converts some fraction of the feed oil to
lighter oil components with the remaining product being a
heavy oil cut product.
The present methods take a different approach with
respect to the following factors: an inclined dual inner and
outer tube unit arrangement where the feed oil enters the unit
through the inner tube. The oil is heated to the target
temperature and then exits the inner tube within the outer
tube. Vaporized oil moved further up the outer tube whereas
the liquid oil drains down the annular space between the
inner and outer tubes. Heat is applied directly to the outer
wall of the unit—this can be done by electrical heating or
natural gas heating.
Throughout this specification, numerous terms and
expressions are used in accordance with their ordinary
meanings. Provided below are definitions of some additional
terms and expressions that are used in the description that
follows.
"Oil" is a naturally occurring, unrefined petroleum prod-
uct composed of hydrocarbon components.
"Bitumen" and "heavy oil" are normally distinguished
from other petroleum products based on their densities and
viscosities. "Heavy oil" is typically classified with density of which is between 920 and 1000 kg/m³. "Bitumen" typically has density greater than 1000 kg/m³. For purposes of this specification, the terms "oil", "bitumen" and "heavy oil" are used interchangeably such that each one includes the other. For example, where the term "bitumen" is used alone, it includes within its scope "heavy oil".

"Cracking" refers to the splitting larger hydrocarbon chains into smaller-chained compounds.

Figure 1:
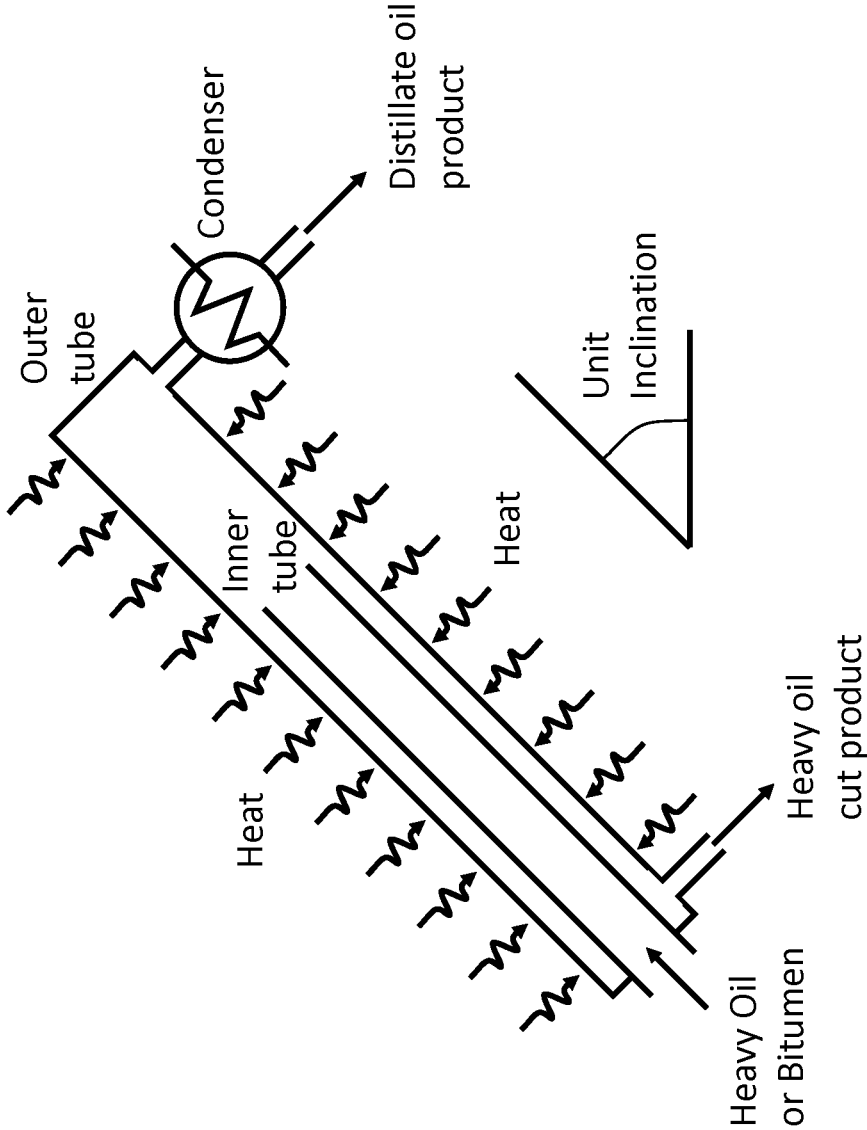
FIG. 1 is a diagram illustrating the method described
herein for treating a heavy oil or bitumen (source oil) to a
light distillate oil product and a heavy oil cut product.

FIG. 1 illustrates an implementation of the present method and device for treating a heavy oil or bitumen or mixture of the two, referred to as the feed oil. In this method and device shown in FIG. 1, the feed oil flows into the inner tube of the inclined dual tube device and flows up the inner tube. As it flows through the inner tube, the oil is heated to the target temperature in the unit. The temperature of the unit is maintained between 300 and 500° C., most preferably between 350 and 450° C. The feed oil is thermally cracked within the inner tube and some fraction of the oil is converted to a vaporized light oil distillate product which flows out from the inner tube at its upper exit into the outer tube and then flows out the top of the outer tube to be condensed to a liquid light distillate product. The remaining liquid oil that exits the inner tube and flows down the annular space between the inner and outer tubes and is further thermally cracked into a vapor which rises up the annular space until it exits the outer tube and is condensed to yield the light distillate oil product. The heavy oil cut product that remains drains from the annular space via an exit port through the outer tube at the bottom of the outer tube.

The device described in FIG. 1 is inclined between 20 and 90° with respect to the horizontal, preferably between 30 and 70° with respect to the horizontal, and more preferably between 40 and 60° with respect to the horizonal.

The thermal cracking reactions that occur in the device described in FIG. 1 start in the inner tube and continue in the annular space between the inner and outer tubes.

The location of the exit of the inner tube within the outer tube is between the upper 25 and 90% of the length of the outer tube, preferably between the upper 50 and 80% of the length of the outer tube, and more preferably between the upper 50 and 65% of the length of the outer tube.

The location of the upper and lower exits for the vaporized oil product and heavy oil cut products, respectively, are or near the top and bottom ends of the outer tube, respectively. Preferably, these exits are within a length equal or smaller than two diameters of the outer tube from the ends of the outer tube.

Hydrogen can be added to the inlet feed oil for supporting hydrogenation reactions within the device.

The tubes could have catalyst, e.g. nickel or palladium based, present to support upgrading of the feed oil.

Figure 2:
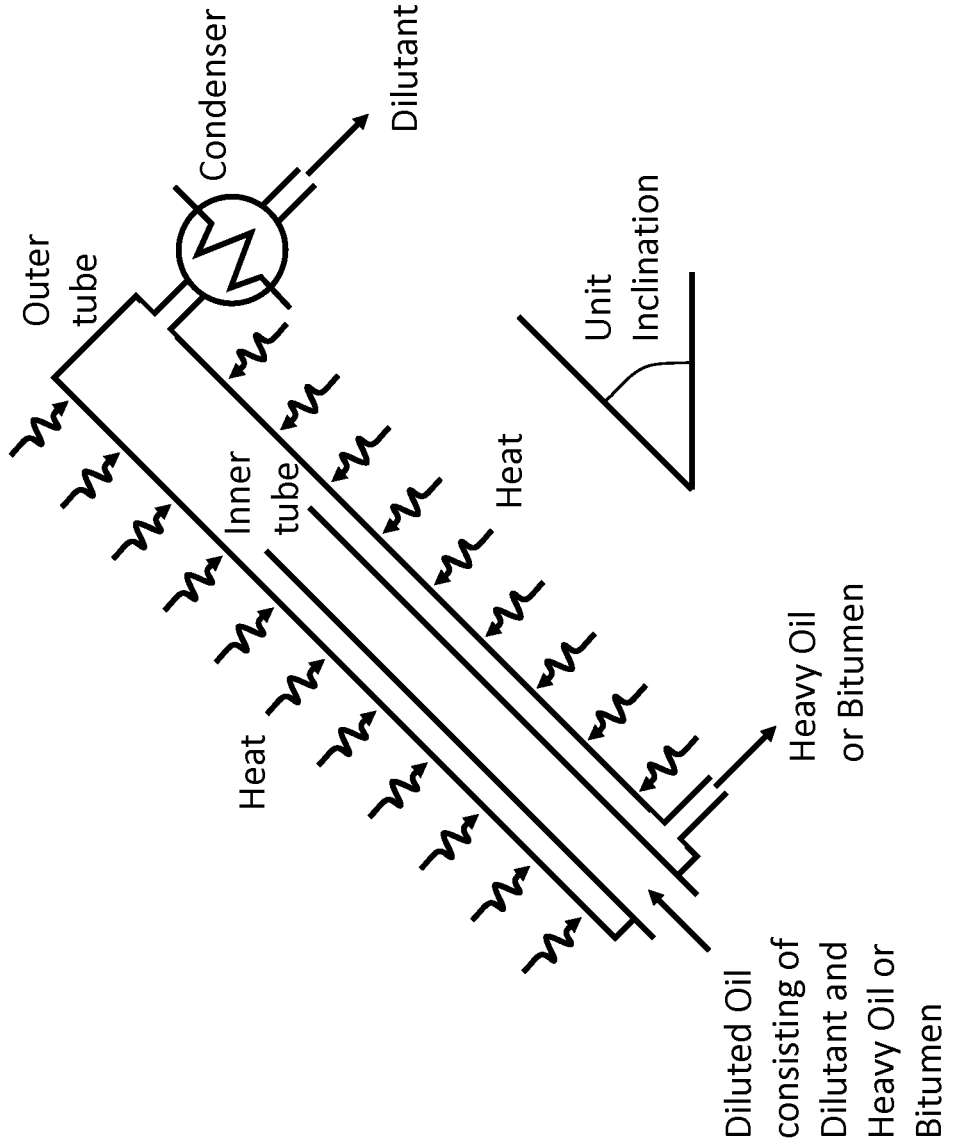
FIG. 2 is a diagram illustrating the method described
herein for treating a mixture of a dilutant and heavy oil or
bitumen (diluted oil) to the dilutant and the heavy oil or
bitumen.

FIG. 2 displays another embodiment of the invention where a mixture of a dilutant and heavy oil or bitumen (diluted oil) is fed to the inner tube.

In this method and device described in FIG. 2, the diluted oil flows into the inner tube of the inclined dual tube device and flows up the inner tube. As it flows through the inner tube, the oil is heated to the target temperature in the unit. The temperature of the unit is maintained between 150 and 350° C., most preferably between 200 and 300° C. The feed oil is heated sufficient so that some fraction of the dilutant within the diluted oil fed to the unit is evaporated within the inner tube which flows out from the inner tube at its upper exit into the outer tube and then flows out the top of the outer tube to be condensed to a liquid dilutant product. The remaining liquid oil, consisting of the remaining dilutant and heavy oil or bitumen in the liquid phase, that exits the inner tube flows down the annular space between the inner and outer tubes and is further treated evaporating the remaining dilutant from the liquid oil which rises up the annular space until it exits the outer tube and is condensed to yield the liquid dilutant product. The heavy oil or bitumen flows from the annular space via an exit port through the outer tube at the bottom of the outer tube.

The device described in FIG. 2 is inclined between 20 and 90° with respect to the horizontal, preferably between 30 and 70° with respect to the horizontal, and more preferably between 40 and 60° with respect to the horizonal.

The phase change (evaporation) that occur in the device described in FIG. 2 start in the inner tube and continue in the annular space between the inner and outer tubes.

In FIG. 2, the location of the exit of the inner tube within the outer tube is between the upper 25 and 90% of the length of the outer tube, preferably between the upper 50 and 80% of the length of the outer tube, and more preferably between the upper 50 and 65% of the length of the outer tube.

In FIG. 2, the location of the upper and lower exits for the dilutant product and heavy oil or bitumen products, respectively, are or near the top and bottom ends of the outer tube, respectively. Preferably, these exits are within a length equal or smaller than two diameters of the outer tube from the ends of the outer tube.

Figure 3:
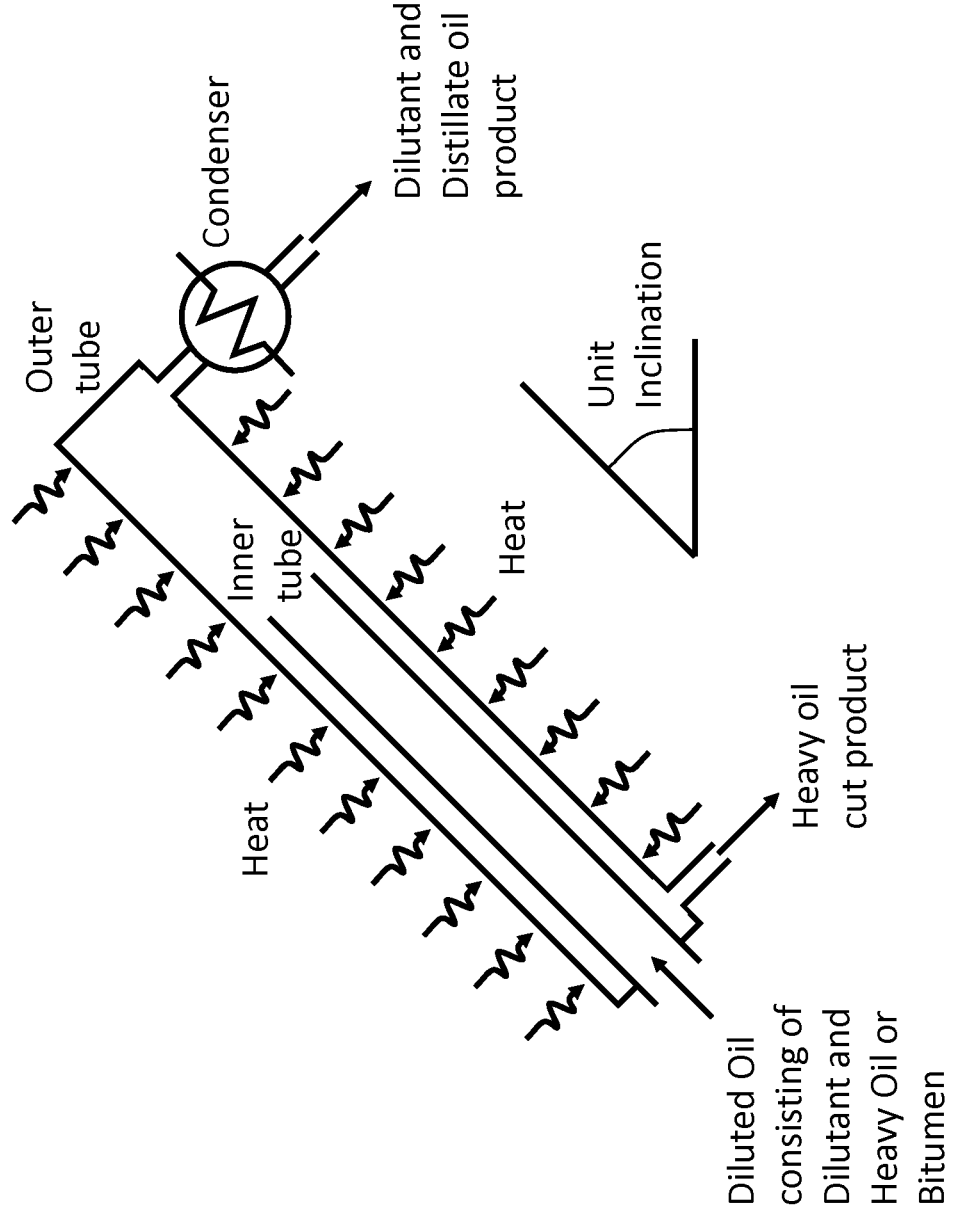
FIG. 3 is a diagram illustrating the method described
herein for treating a mixture of a dilutant and heavy oil or
bitumen (diluted oil) to the dilutant, a light distillate oil
product, and a heavy oil cut product.

FIG. 3 displays another embodiment of the invention where a mixture of a dilutant and heavy oil or bitumen (diluted oil) is fed to the inner tube.

In this method and device described in FIG. 3, the diluted oil flows into the inner tube of the inclined dual tube device and flows up the inner tube. As it flows through the inner tube, the oil is heated to the target temperature in the unit. The temperature of the unit is maintained between 150 and 500° C., most preferably between 250 and 450° C. The feed oil is heated sufficient so that some fraction of the dilutant within the diluted oil fed to the unit is evaporated within the inner tube which flows out from the inner tube at its upper exit into the outer tube and then flows out the top of the outer tube to be condensed to a liquid dilutant product. Simultaneously, the heavy oil or bitumen that is flowing in the inner tube is thermally cracked and some fraction of the oil is converted to a vaporized light oil distillate product within the inner tube which flows out from the inner tube at its upper exit into the outer tube and then flows out the top of the outer tube to be condensed to a liquid distillate product. The remaining liquid oil, consisting of the remaining dilutant and heavy oil or bitumen in the liquid phase, that exits the inner tube flows down the annular space between the inner and outer tubes and is further treated evaporating the remaining dilutant from the liquid oil which rises up the annular space until it exits the outer tube and is condensed to yield the liquid dilutant product. Simultaneously, the liquid oil flows down the annular space between the inner and outer tubes and is further thermally cracked into a vapor which rises up the annular space until it exits the outer tube and is condensed to yield the light distillate oil product. The heavy oil cut product flows from the annular space via an exit port through the outer tube at the bottom of the outer tube.

The device described in FIG. 3 is inclined between 20 and 90° with respect to the horizontal, preferably between 30 and 70° with respect to the horizontal, and more preferably between 40 and 60° with respect to the horizonal.

The phase change (evaporation) that occur in the device described in FIG. 3 start in the inner tube and continue in the annular space between the inner and outer tubes.

In FIG. 3, the location of the exit of the inner tube within the outer tube is between the upper 25 and 90% of the length of the outer tube, preferably between the upper 50 and 80% of the length of the outer tube, and more preferably between the upper 50 and 65% of the length of the outer tube.

In FIG. 3, the location of the upper and lower exits for the dilutant product and heavy oil or bitumen products, respectively, are or near the top and bottom ends of the outer tube, respectively. Preferably, these exits are within a length equal or smaller than two diameters of the outer tube from the ends of the outer tube.

Figure 4:
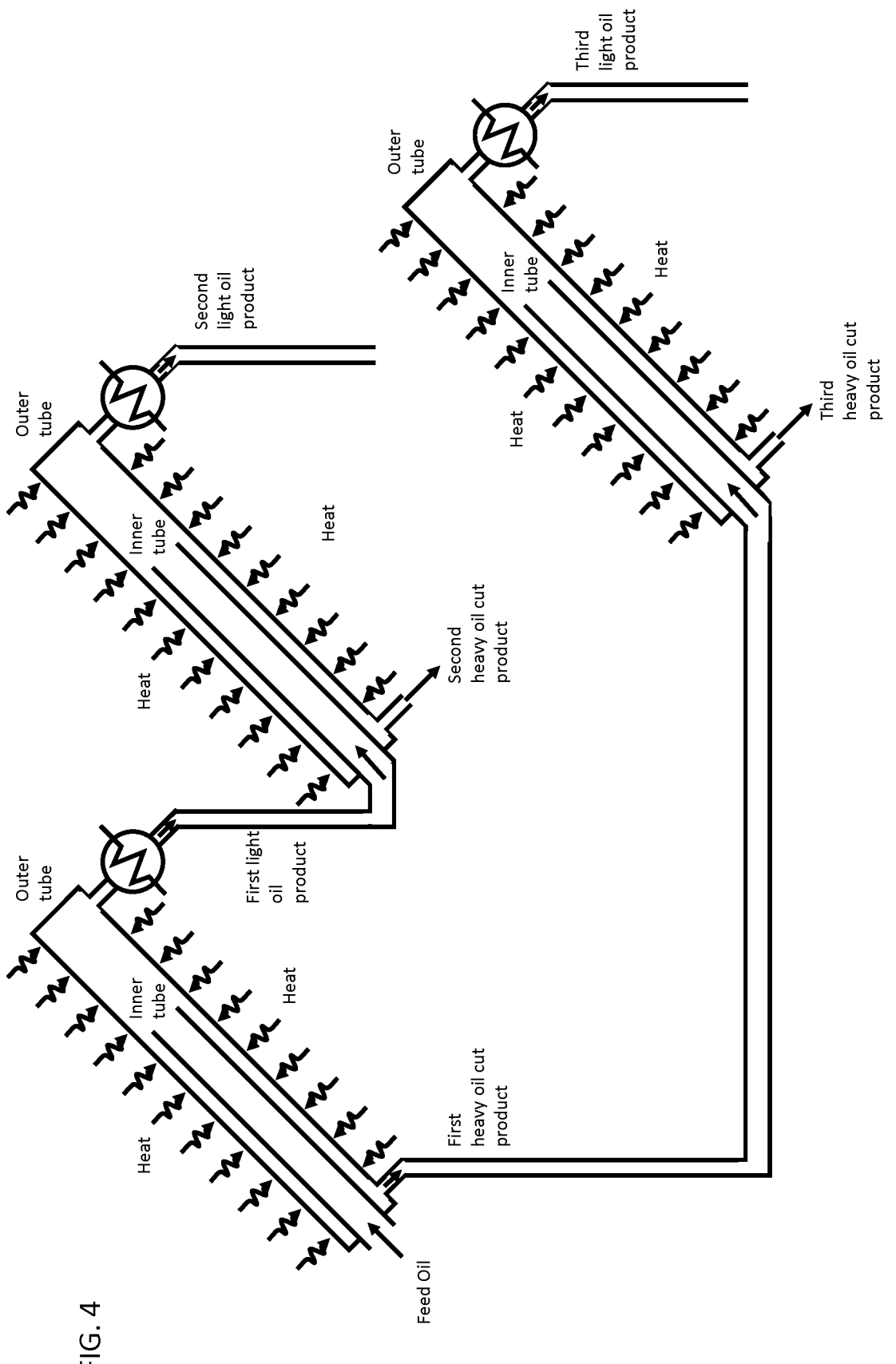
FIG. 4 is a diagram illustrating the method described
herein for treating a mixture of a dilutant and heavy oil or
bitumen (diluted oil) to the dilutant, a light distillate oil
product, and a heavy oil cut product.

FIG. 4 displays another embodiment of the invention where a mixture of a dilutant and heavy oil or bitumen (diluted oil) is fed to the inner tube.

In this method and device described in FIG. 4, the feed oil (raw heavy oil or bitumen or mixture of diluent/dilutant and heavy oil or bitumen) flows into the inner tube of the first inclined dual tube device and flows up the inner tube. As described above, the feed oil is separated into the light and heavy cuts by using the inclined tube-in-tube arrangement but in this case, the light oil product flows to a second device and the heavy cut flows to another device. In this manner, multiple devices can be connected together to form an array of units where the output products from one device are fed to other devices to yield further products.

Details are provided for the purpose of illustration, and the methods can be practiced without some or all of the features discussed herein. For clarity, technical materials that are known in the fields relevant to the present methods are not discussed in detail.

The heat on the outer tube can be delivered through a variety of methods including induction heating, heat tracing tape, steam heating, natural gas heating, and electrical resistance heating.

Prior to entering the inclined dual tube device, the feed oil or diluted oil can be pre-heated to a temperature near the operating temperature of the device. This temperature can be between 150 and 500° C., preferably between 10 and 20° C. below the operating temperature of the device. The exiting fluids streams can be used to exchange heat to the feed oil to raise the thermal efficiency of the unit.

Although the present specification has described particular embodiments and examples of the methods and treatments discussed herein, it will be apparent to persons skilled in the art that modifications can be made to the embodiments without departing from the scope of the appended claims.

We claim:

1. A process for continuously fractionating hydrocarbons, comprising:

providing a hydrocarbon feed fluid comprising a heavy oil component and a light end component;

feeding the hydrocarbon feed fluid upwardly into an inner inlet tube of an upwardly inclined dual tube device, the dual tube device being inclined upwardly from horizontal by between 30° and 70°, the inner inlet tube being housed within an annular outer tube, the space between the inner inlet tube and the outer tube forming an annulus in fluid communication with the inlet tube, the upper end of the inner inlet tube terminating in an open inlet tube upper end within the outer tube, an upper portion of the outer tube extending above and beyond the open inlet tube upper end, so that the hydrocarbon feed fluid exits the open inlet tube upper end and flows downwardly into the annulus;

externally heating a lower portion of the outer tube, so that downwardly flowing hydrocarbon feed fluid in the annulus is heated, to form a heated hydrocarbon fluid in the annulus, the heated hydrocarbon fluid thereby providing counter-current heating of the hydrocarbon feed fluid in the inner inlet tube;

maintaining fractionating conditions within the annulus, so that the heated hydrocarbon fluid is thermally fractionated into a volatile upward gaseous fluid flow and a residual downward liquid fluid flow, the gaseous fluid comprising the light end component and the liquid fluid comprising the heavy oil component, the fractionating conditions comprising an effective residence time for the heated hydrocarbon fluid in the annulus of from 1 to 20 minutes, or from 1 to 10 minutes;

collecting the light end component from a light end outlet port in the upper end of the outer tube; and, collecting the heavy oil component from a heavy oil outlet port in the lower end of the annulus.

2. The process of claim 1, wherein the dual tube device is inclined upwardly from horizontal by about 45°.

3. The process of claim 1, wherein the upper portion of the outer tube extending above and beyond the open inlet tube upper end is from one-third to two-thirds the length of the annulus.

4. The process of claim 1, wherein the outer tube has a full effective length from the heavy oil outlet port to the light end outlet port, and the lower portion of the outer tube to which external heating is applied is a bottom one-third portion of the full effective length of the outer tube.

5. The process of claim 1, wherein the hydrocarbon feed fluid comprises bitumen.

6. The process of claim 1, wherein the hydrocarbon feed fluid comprises a hydrocarbon diluent.

7. The process of claim 1, wherein the fractionating conditions comprise a fractionating temperature of between 150° C. and 500° C.

8. The process of claim 7, wherein the fractionating temperature is between 230° C. and 480° C.

9. The process of claim 1, further comprising a condenser positioned to condense the light end component to a light end liquid product.

10. The process of claim 1, where the hydrocarbon feed fluid comprises a water component, and the collected light end component comprises at least a portion of the water component, thereby separating oil and water components of the hydrocarbon feed fluid.

11. The process of claim 1, where a hydrogen source is added to the hydrocarbon feed fluid, and the fractionation conditions are effective to react the hydrogen source with the heated hydrocarbon fluid to provide an upgraded oil product in the heavy oil component.

12. The process of claim 11, wherein the hydrogen source comprises hydrogen gas.

13. The process of claim 1, further comprising providing a catalyst on a surface of the inner tube or the annulus, wherein the fractionating conditions are effective to cause the catalyst to facilitate a reaction in the heated hydrocarbon fluid to provide a catalytically upgraded oil product in the heavy oil component.

14. The process of claim 1, further comprising a plurality of inclined dual tube devices operating in series, with heavy oil components collected from one inclined dual tube device being use as the hydrocarbon feed fluid for a successive inclined dual tube device in the series.

* * * * *